United States Patent
Liehs et al.

(12) 
(10) Patent No.: US 6,213,707 B1
(45) Date of Patent: Apr. 10, 2001

(54) AUTOMATIC SYSTEM FOR UNPACKING BOXES

(75) Inventors: Rupert Hubert Liehs; Bernard Claus Liehs; Martin Rupert Liehs, all of Waterloo (CA)

(73) Assignee: International Machinery and Guarding Systems Inc., Waterloo (CA)

( * ) Notice: Subject to any disclaimer, the term of this patent is extended or adjusted under 35 U.S.C. 154(b) by 0 days.

(21) Appl. No.: 09/318,707

(22) Filed: May 26, 1999

(30) Foreign Application Priority Data

May 28, 1998 (CA) .................................................. 2238912

(51) Int. Cl.⁷ .................................................. B65G 65/23
(52) U.S. Cl. ............................................ 414/421; 414/405
(58) Field of Search ...................................... 414/405, 421

(56) References Cited

U.S. PATENT DOCUMENTS 4,696,617 * 9/1987 Kumata et al. .................. 414/405 X

* cited by examiner

*Primary Examiner*—Steven A. Bratlie
(74) *Attorney, Agent, or Firm*—Anthony Asquith & Co.

(57) ABSTRACT

Cardboard cartons are delivered to a soft-drink-can packaging line in boxes. The boxes are placed on a box-conveyor, from which the boxes are tranferred one by one into a bucket. The bucket holds the box while the box is overturned. In one version, the overturned box with the items inside is then moved to a magazine, where the box is pulled clear. In another version, the bucket is opened and the box pulled clear, and then the bucket is re-orientated before the items are transferred onto the magazine. The apparatus is mounted on a frame which includes uprights to which the major components can be clamped in place, allowing the apparatus to be adapted to existing machinery.

24 Claims, 10 Drawing Sheets

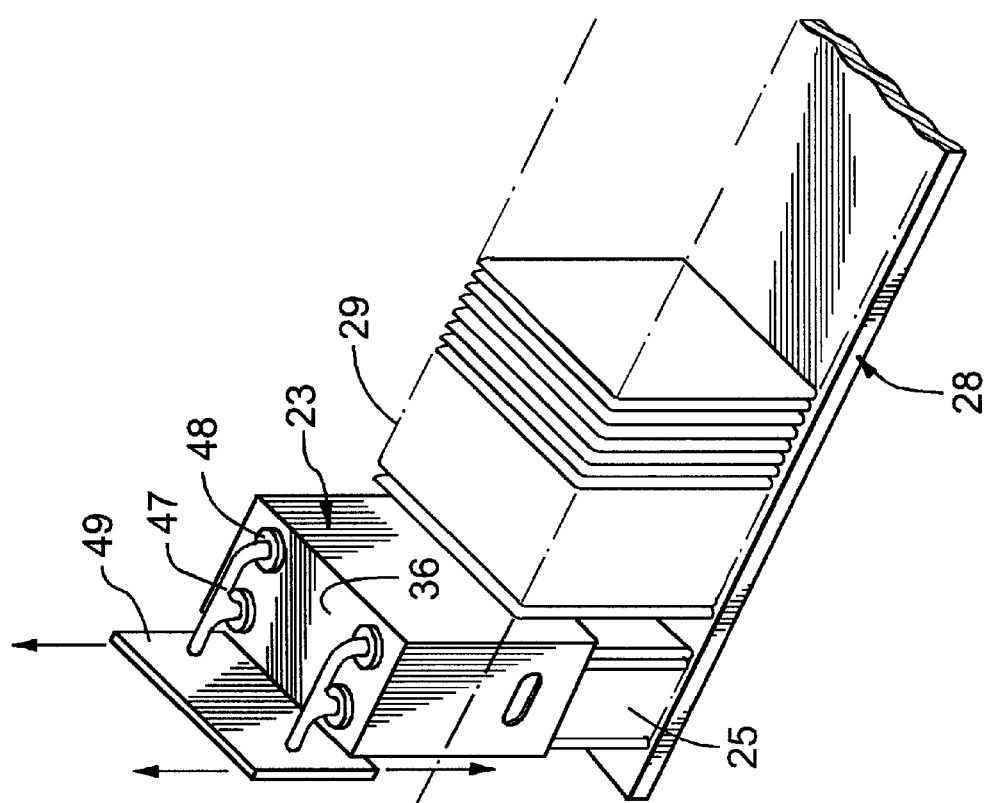
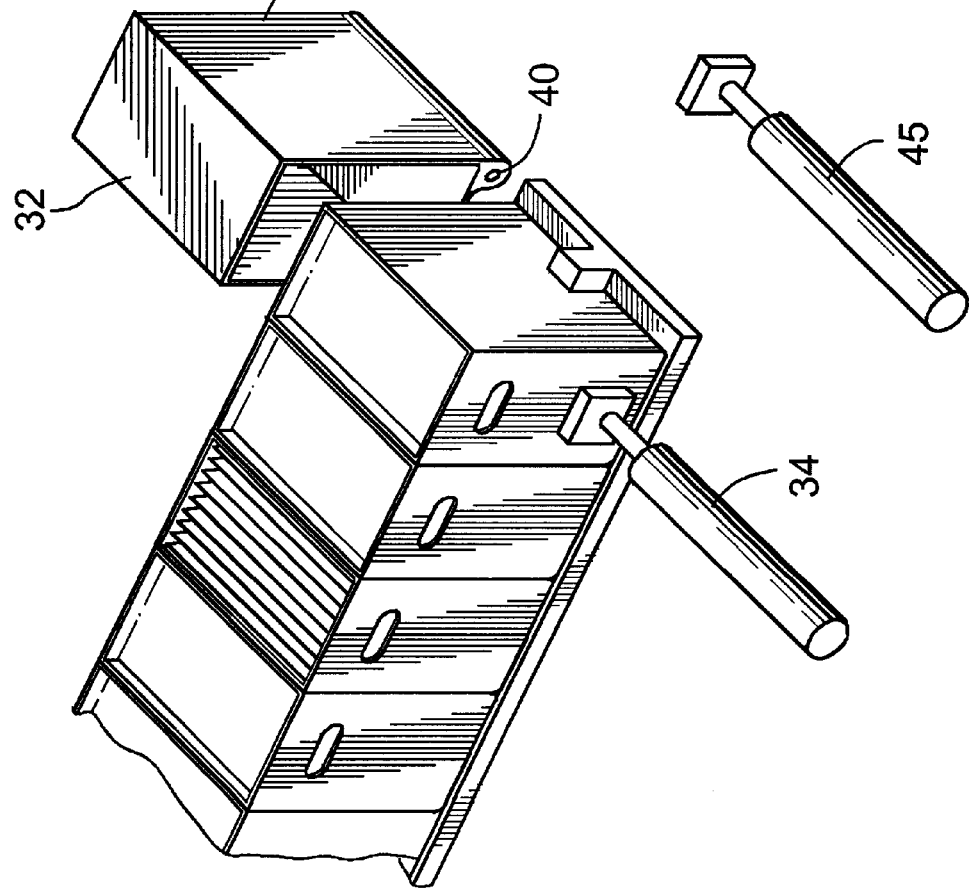
FIG. 3

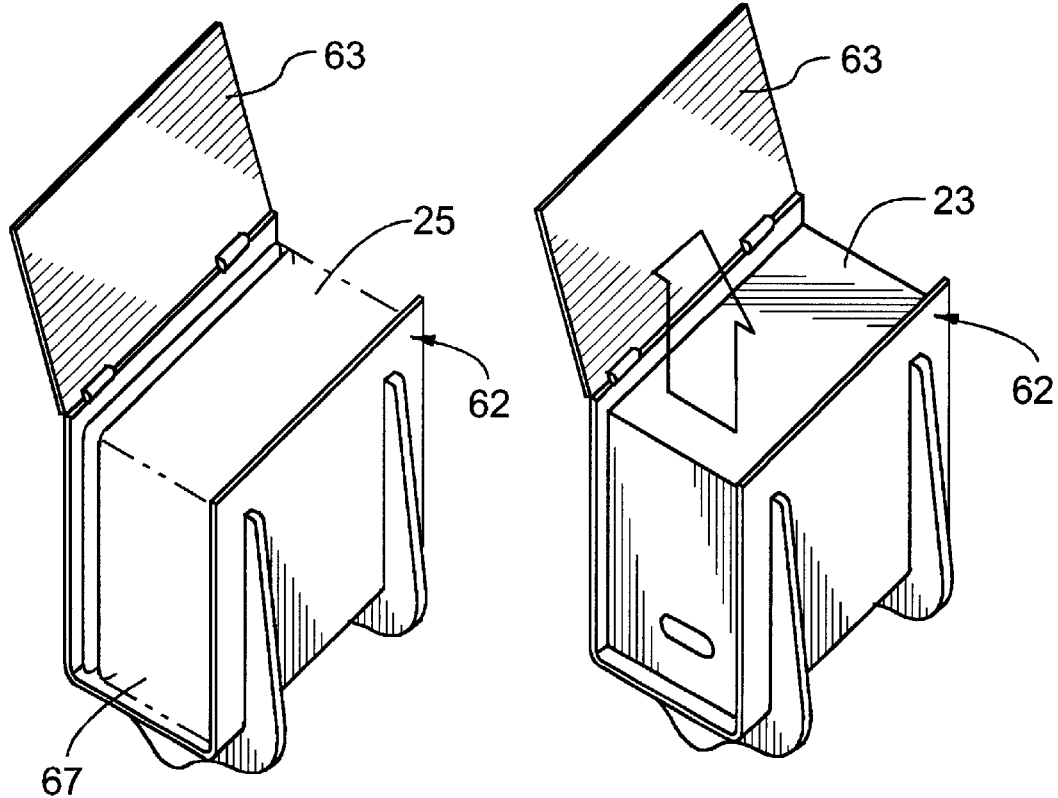
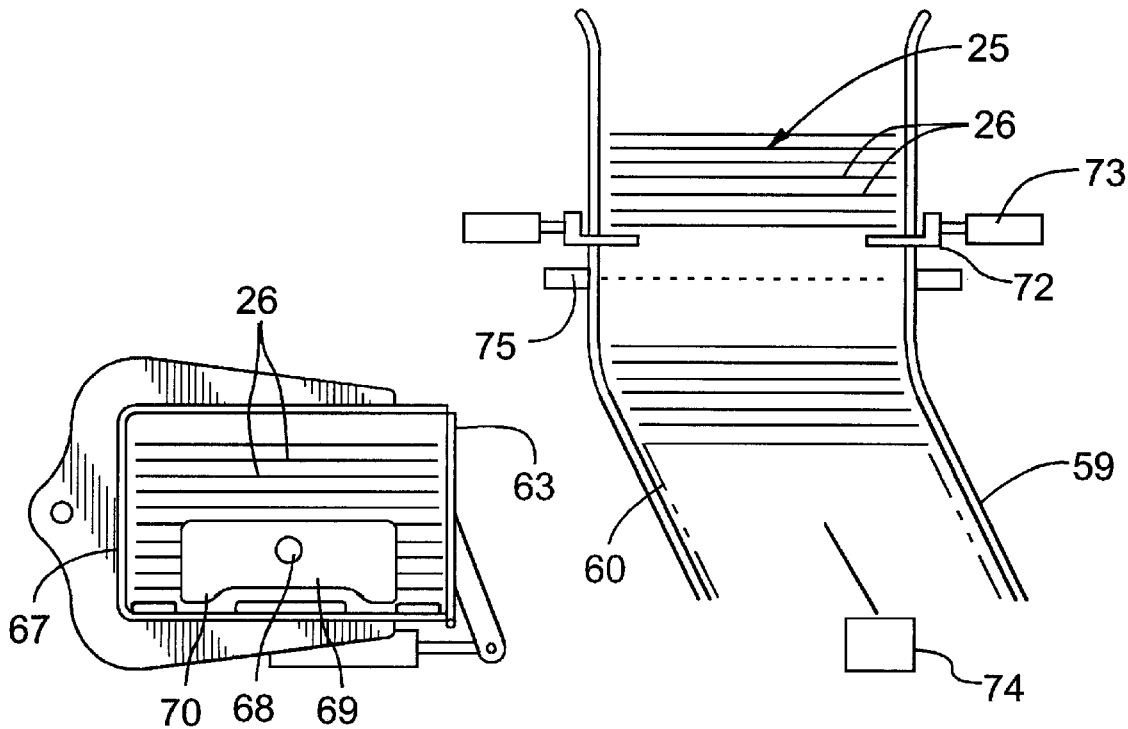

AUTOMATIC SYSTEM FOR UNPACKING BOXES

This invention relates to packaging operations, and in particular to a system for unpacking items, such as flattened cardboard cartons, from the boxes in which such items are transported and delivered.

BACKGROUND TO THE INVENTION

Soft-drinks cans are typically sold in packs of 24 cans, packaged into a cardboard case or carton. The operation of packaging cans into cardboard cartons has been the subject of continuing development over the years, whereby in conventional packaging plants the whole operation is now more or less completely automated.

However, one area in which introduction of automation has been slow is the area of un-packing the cardboard cartons from the boxes in which the cartons are delivered to the packaging plant.

Boxes containing e.g two or three hundred (flattened) cartons are delivered from the carton manufacturer to the packaging plant. Generally, the boxes are palletized for delivery. Typically, de-palletization has been automated, but the conventional practice then has been for the cartons to be unpacked from the boxes and placed into the magazine of the packaging apparatus by hand, or at least, if not actually by hand, by a procedure that includes more manual handling than is desirable in what is otherwise basically a fully automated procedure. Also, it is recognized that such automation as has been introduced into the area of unpacking the cartons from the boxes has been viewed rather as providing motorized assistance to the operator in his manual unpacking operations, rather than automation as such.

The present invention is concerned with automating the apparatus and procedures for removing cartons from boxes of the cartons, and transferring the cartons to the carton-magazine of the packaging machine.

The invention is described herein as it applies to the unpacking of flat-form cardboard cases or cartons from cardboard boxes, but the invention may be applied to unpacking items from boxes, in general.

THE PRIOR ART

Patent publication U.S. Pat. No. 5,330,311 (Cawley, July 1994) describes a robot for extracting bundles of cartons from cardboard boxes. This publication serves to illustrate the complexity with which the box-unpacking operation has been approached by earlier designers, and illustrates why automation of the box-unpacking operation has been so slow.

GENERAL FEATURES OF THE INVENTION

In the invention, it is arranged that the box containing the items is unpacked by first turning the box over, and then pulling the box upwards, clear of the items. The operation is facilitated by transferring the box into a bucket, in which the box and the cartons are retained while the box is turned over.

Preferably, the box is pulled upwards at a time when the sides of the box are relieved of pressure. It is recognised that it is much more efficacious to pull the box upwards, leaving the items behind, than it would be, for example, to try to pull the box laterally or sideways. When the box is pulled upwards, the items can be separated from the box simply by leaving the items behind, i.e by letting gravity in effect pull the items out of the box. When the box is pulled upwards, the friction associated with trying to pull the box sideways, plus the need to hold the items in a gripper while the box is being pulled clear, is avoided.

Naturally, the designer should arrange that the items are loose enough in the boxes that the boxes can be pulled clear, but that is simple. Also, the designer should arrange that the box is not subjected to friction or other restrictive actions during the upwards-lifting operation. As will be described, when the apparatus is arranged as described herein, the box can be isolated from virtually all drag and friction, and as a result the box can be pulled upwards using a conventional suction-cup head, mounted on a trolley.

The boxes are arranged, prior to being unpacked, on a box-conveyor, upon which dozens, or hundreds, of boxes can be stored, and from which the boxes can be transferred one by one, by a lateral push from a simple pneumatic ram.

It is an aim of the invention to make use of gravity as much as possible, and to make use of simple single-motion rams and such simple operations. Also, it is an aim that most of the moving/powered components of the apparatus be mounted on the fixed frame of the apparatus; that is to say, it is an aim of the invention that the number of components that are mounted on other moving components be kept to a minimum.

The apparatus is described in two versions. In the first version, the items (cartons) are delivered to a magazine in the near-vertical orientation; in the second version, the items are delivered to a magazine in the horizontal configuration. As will be seen, the designer should arrange that the box is pulled upwards at a time when the box is upturned and the bottom of the box is uppermost, and that requirement may dictate that the unpacked items be re-orientated after the box has been removed, in the one version, or may dictate that the unpacked items can be placed straight onto the magazine, in the other version.

DETAILED DESCRIPTION OF PREFERRED EMBODIMENTS

By way of further explanation of the invention, exemplary embodiments of the invention will now be described with reference to the accompanying drawings, in which:

FIG. 3 is a similar diagram of the apparatus of FIG. 1, shown in a different stage of operation;

FIG. 6 is a diagram of some of the components of the apparatus of FIG. 5;

FIG. 7 shows the components of FIG. 6 at a different stage of operation;

FIG. 8 shows the components of FIG. 6 at a different stage of operation;

FIG. 9 shows the transfer of items to a magazine associated with the apparatus of FIG. 5;

The apparatuses shown in the accompanying drawings and described below are examples that embody the invention. It should be noted that the scope of the invention is defined by the accompanying claims, and not necessarily by specific features of exemplary embodiments.

Figure 1:
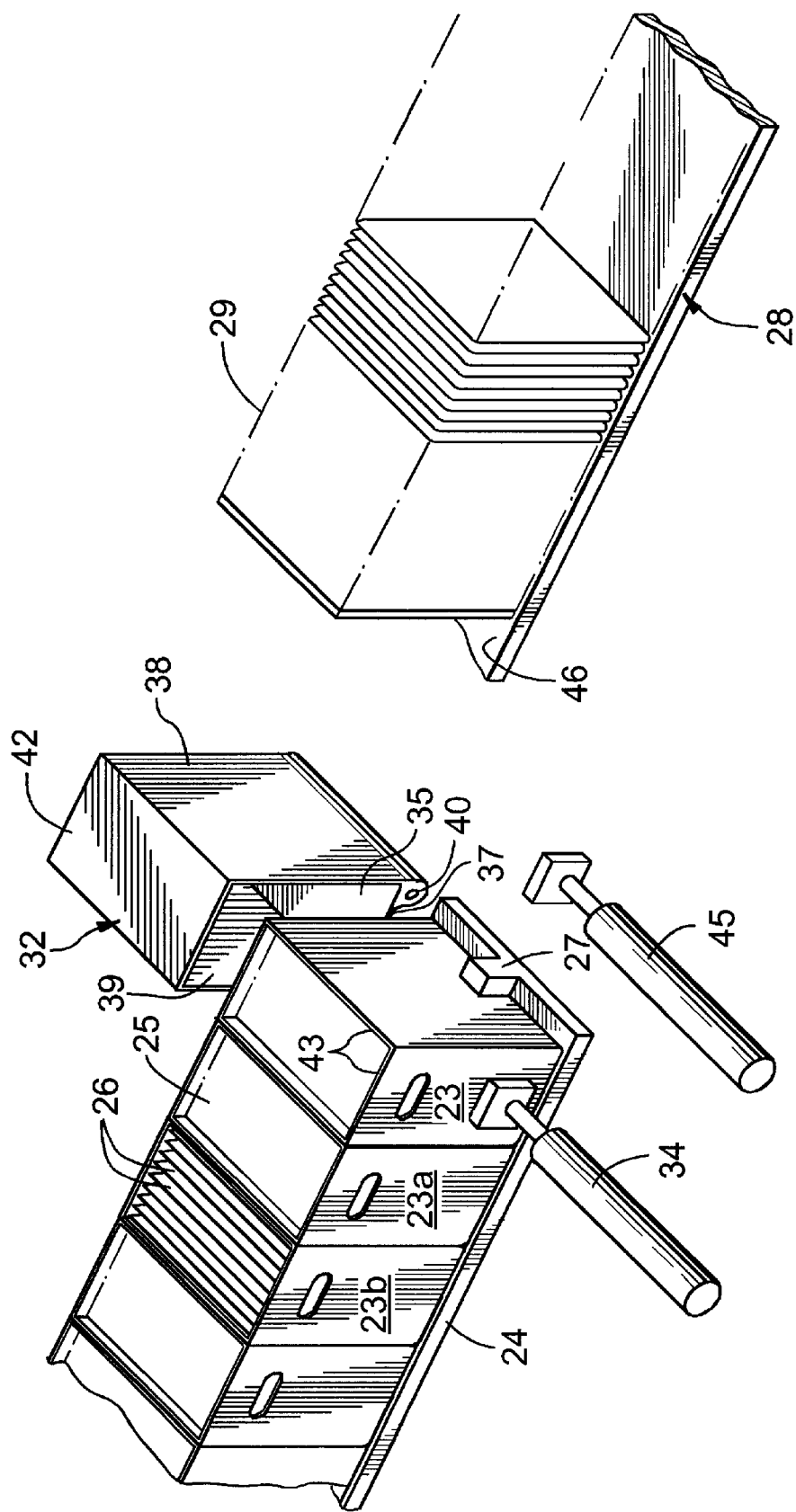
FIG. 1 is a diagrammatic representation of an apparatus that embodies the invention.

In the apparatus 20 as shown in FIG. 1, cardboard boxes 23,23a,23b . . . reside on an overhead box-conveyor 24. The boxes contain each a bundle 25 comprising say three hundred flattened cartons 26. The cartons 26 are for receiving each a quantity of goods to be packaged, for example soft-drink cans to be packaged.

The cartons arrive from the carton manufacturing and printing facility, packed in the cardboard boxes. Typically, the boxes are supplied to the packaging plant on pallets, the boxes being arranged in layers on the pallet. Typically, the layers are separated by means of slip-sheets, of cardboard, the boxes themselves being open-topped.

Upon arrival at the packaging plant, the open-top boxes are transferred from the pallet onto the overhead box-conveyor 24. The box-conveyor is made as long as is required to accommodate the cartons needed for a long period of packaging production. Typically, the box-conveyor might be arranged to hold one day's supply of cartons. Thus, the operation of transferring the boxes from the pallets to the box-conveyor 24 need be done only once a day (which is in keeping with an operation that is basically fully automated).

The box-conveyor 24 must of course be of adequate length to store several thousand cartons. However, providing the box-conveyor in a long length is generally no problem in that the length of the box-conveyor can be convoluted, and in that the box-conveyor can be elevated, and overhead, where the box-conveyor is out of the way and there is plenty of room. A motorized section (not shown) of the box-conveyor 24 is provided for raising the boxes to the elevated level, whereupon the boxes are gently gravity-biassed towards the end of the conveyor. An abutment 27 defines the end of the box-conveyor 24, and the box that rests against the abutment 27 is termed the senior box 23.

Associated machinery unfolds the cartons, automatically packs the soft-drink cans in the cartons, and seals the cans in the cartons. The associated machinery includes a carton-magazine 28, in which a stack 29 of the cartons are stored (in the flattened state), while awaiting the packaging operations. The cartons in the magazine 28 are cartons that have been removed from the boxes.

The machinery includes a carton-picker 30 (FIG. 4), located at the end of the magazine 28, which picks the next carton off the stack 29 of cartons in the magazine, and feeds that carton into the packaging process. The carton-picker is sensitive to pressure, in that the cartons must not be pressed too strongly, nor too lightly, into contact with the carton-picker.

The consequences of two cartons being picked at once, or of no carton being picked at all, are quite disruptive to the packaging process. One of the factors that assists in maintaining a steady one-and-only-one carton-picking performance lies in keeping steady the force with which the cartons are pressed against the carton-picker. If the force of the cartons pressing against the carton-picker should vary, the accuracy of the carton-picker can be expected to deteriorate. The designer of the means for adding more cartons to the stack 29 of cartons in the magazine 28 should be aware of the importance of keeping the force on the carton-picker constant.

It is recognized that keeping the number of cartons in the stack 29 of cartons in the magazine 28 reasonably constant is an important aid to keeping the force on the carton-picker 30 constant. If the magazine itself had to cope with the imposition once a day of a whole day's supply of cartons into the magazine, all at once, the carton-picker could hardly be expected to maintain accurate picking. The designer preferably should ensure that the number of cartons in the stack 29 stored in the magazine should vary as little as possible. The invention enables the boxes 23,23a,23b . . . of cartons to be stored on the box-conveyor 24 in large numbers, but enables the boxes to be transferred one by one to the magazine, i.e one box at a time, whereby the variation in the number of cartons that the magazine itself has to cope with need be no more than the contents of one box of cartons. The designer can easily arrange the magazine to cope with that.

It is recognised that large numbers of boxes and cartons can be stored on the box-conveyor 24, without having any effect on the carton-picker 30 in the magazine 28. The box-conveyor can be arranged to store dozens, if not hundreds, of boxes of cartons, containing tens of thousands of cartons. (Soft-drink-can packaging lines produce 30,000 cases or more per day.)

Thus, an important purpose of the apparatus as described herein is to isolate the magazine 28, and especially the carton-picker 30 in the magazine, from having to cope with large variations in the numbers of cartons, while enabling large quantities of cartons to be stored, and ready for automatic transfer to the magazine when needed.

The operation of the apparatus 20 will now be described.

As shown in FIG. 1, the apparatus includes a bucket 32. The bucket is movable to a box-receiving position, in which the bucket can receive the senior box 23, i.e the box that rests against the abutment 27 of the box-conveyor 24. A ram 34 serves to transfer the senior box 23 into the bucket 32. When the ram 34 is withdrawn, the next box 23a moves forwards and comes to rest against the abutment 27, and becomes the new senior box.

When the bucket is aligned in the box-receiving position, the floor 35 of the bucket 32 should be slightly below the bottom 36 of the senior box 23 when the box is pushed into the bucket, to ensure that the box does not snag on the lip 37 of the floor 35 of the bucket. Similarly, the front and rear panels 38,39 of the bucket should be a little wider than the corresponding sides of the box 23.

The bucket 32 is mounted on a pivot 40, about which the bucket can be pivoted with respect to the frame of the apparatus 20. The axis of the pivot 40 is horizontal, and is aligned parallel to the plane of the flattened cartons 26 in the box 23.

The bucket has a floor panel 35, front and rear panels 38,39, and a roof panel 42. Both the left and right sides of the bucket, as defined by the edges of the panels 35,38,39, 42, are open-ended.

Figure 2:
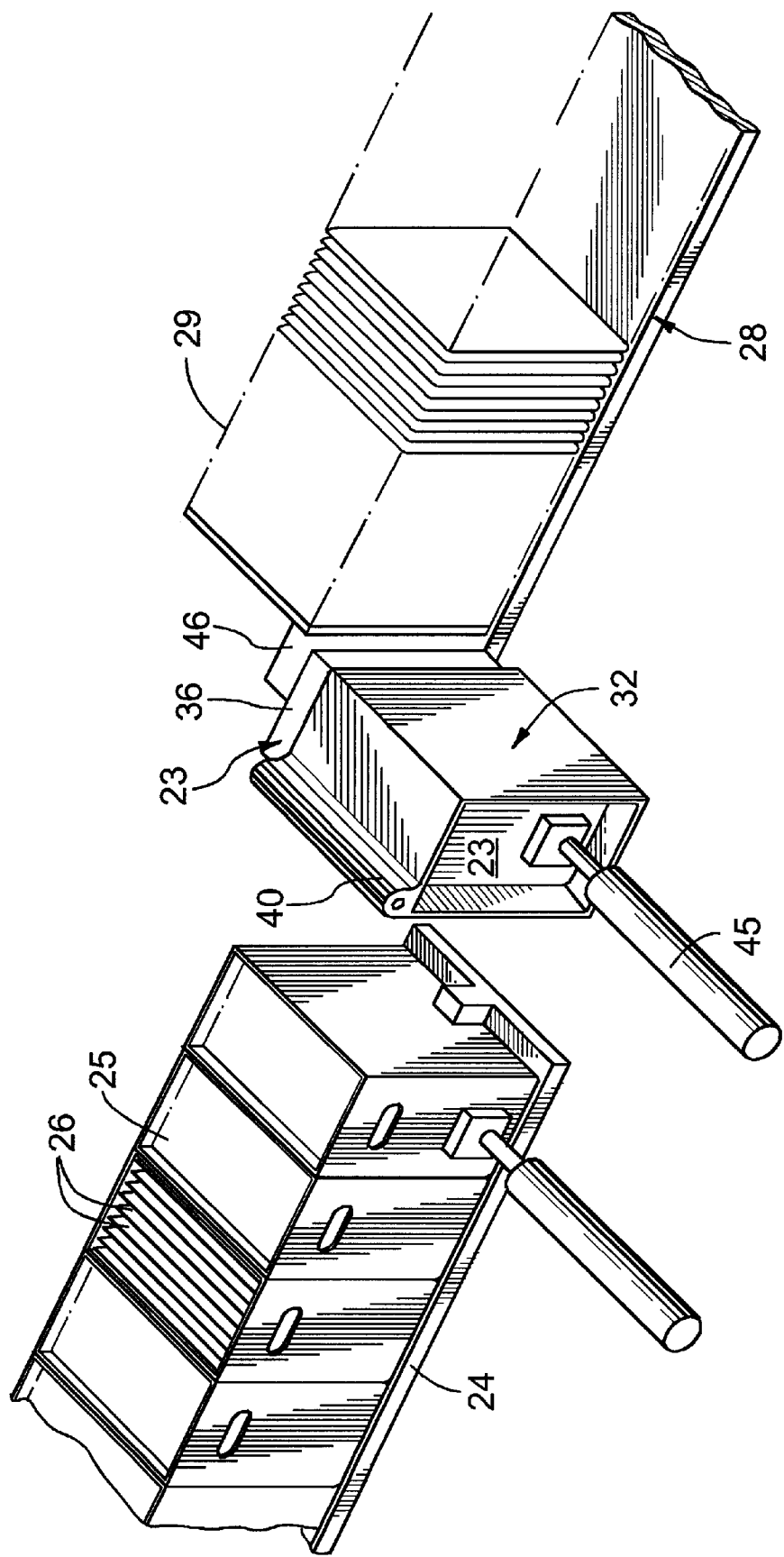
FIG. 2 is a similar diagram of the apparatus of FIG. 1, shown in a different stage of operation.

The bucket 32, with the box 23 of cartons inside, is inverted by rotating the bucket 180 degrees, about the pivot 40. The bucket now lies in the box-inverted position as shown in FIG. 2. During inversion, the top edges 43 of the sides of the box that define the open top of the box fall, and come to rest against the roof panel 42 of the bucket (which now, because of the inversion, faces downwards). The cartons inside the box 23 also fall and come to rest against the roof-panel 42 of the bucket.

A ram 45 transfers the upturned box, and the cartons therein, out of the bucket and onto a tray 46 of the magazine 28. Again, the tray is arranged to be slightly below the level of the roof panel 42 of the bucket when transfer is being effected, to ensure the box does not snag on the edge of the tray, and to ensure the cartons inside the box also do not snag on the edge. The empty bucket can now be returned to the box-receiving position.

The apparatus includes a means for lifting the upturned box upwards, comprising a suction-cup head 47 (FIG. 3). The head 47, which includes four suction-cups 48, is arranged for up/down travel on a motorised trolley 49. The trolley is first brought down until the suction-cups 48 attach themselves securely onto the bottom 36 of the upturned box 23. Then, the trolley 49 is raised upwards, dragging the box 23 with it, and leaving the bundle 25 of cartons 26 behind on the tray 46 of the magazine 28.

The track 50 on which the trolley 49 travels includes a means for turning the trolley over; that is to say, for turning the box 23 back right way up. The righted box 23 is then dropped onto an overhead box-disposal-conveyor 52 (FIG. 4a) by releasing the suction in the cups 48. The disposal-conveyor 52 removes the boxes from the packaging line. The boxes may be recovered later for re-use, or discarded.

The tray 46 of the magazine in fact is at an angle to the horizontal, as shown, and the flattened cartons on the tray lie at a corresponding angle to the vertical. The purpose of this angle is to assist the carton-picker 30 in maintaining the reliability and accuracy of the one-and-only-one picking requirement.

When the upturned box 23 with the cartons inside is residing on the magazine tray, the cartons inside the box 23 inevitably fall against, and rest against, the inside of one of the sides of the box. The contact gives rise to friction, which of course opposes the withdrawal of the box from the cartons. The designer should take care that resistance and friction tending to oppose the withdrawal of the box are kept to a minimum. For example, if the box were laid on its side, i.e with a side of the box horizontal, and the cartons were resting on that side, and if it was then attempted to withdraw the box laterally, the friction caused by the cartons resting on the one side of the box would be considerable.

But when the box is withdrawn upwards, as in the apparatus described herein, the friction opposing the withdrawal of the box is quite negligible. Naturally, the flattened cartons cannot be expected to hold themselves vertically upright, especially in this case since the box is inclined at the angle, and so the friction cannot be said to be zero. But there is an important difference between pulling the box upwards and pulling the box sideways; there is only a tiny opposing friction when the pull is upwards, whereas there would be a considerable friction on the box if the pull were sideways. The low friction associated with the box being vertical is still present even when the box (and the pull) are inclined slightly, as is the case with the apparatus as shown. However, the greater the inclination of the box (i.e the more horizontal the box), the greater the friction, and the designer should aim to keep the box vertical enough to avoid such a friction problem.

Figure 4:
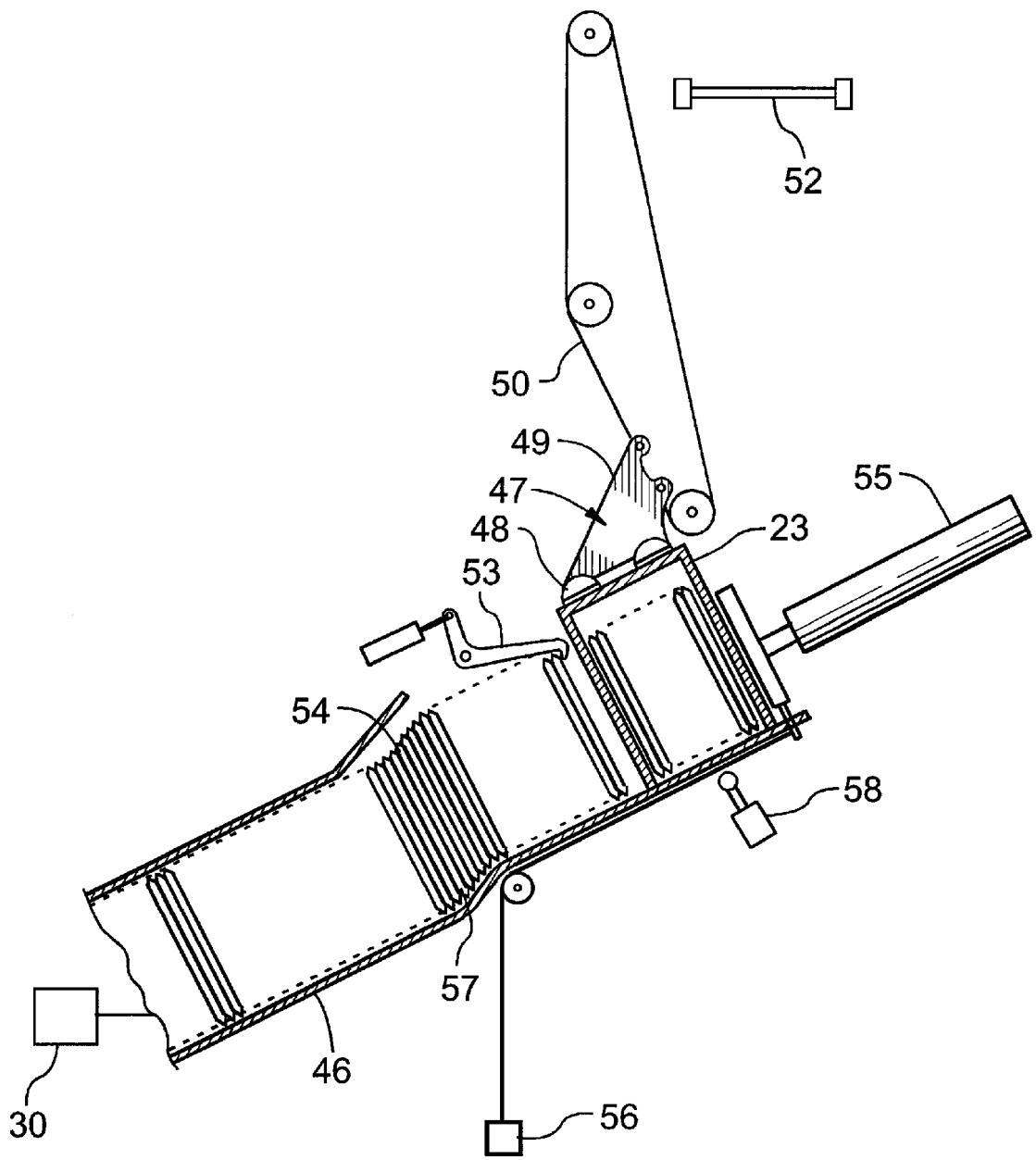
FIG. 4 is another diagram of the apparatus of FIG. 1.
Figure 4A:
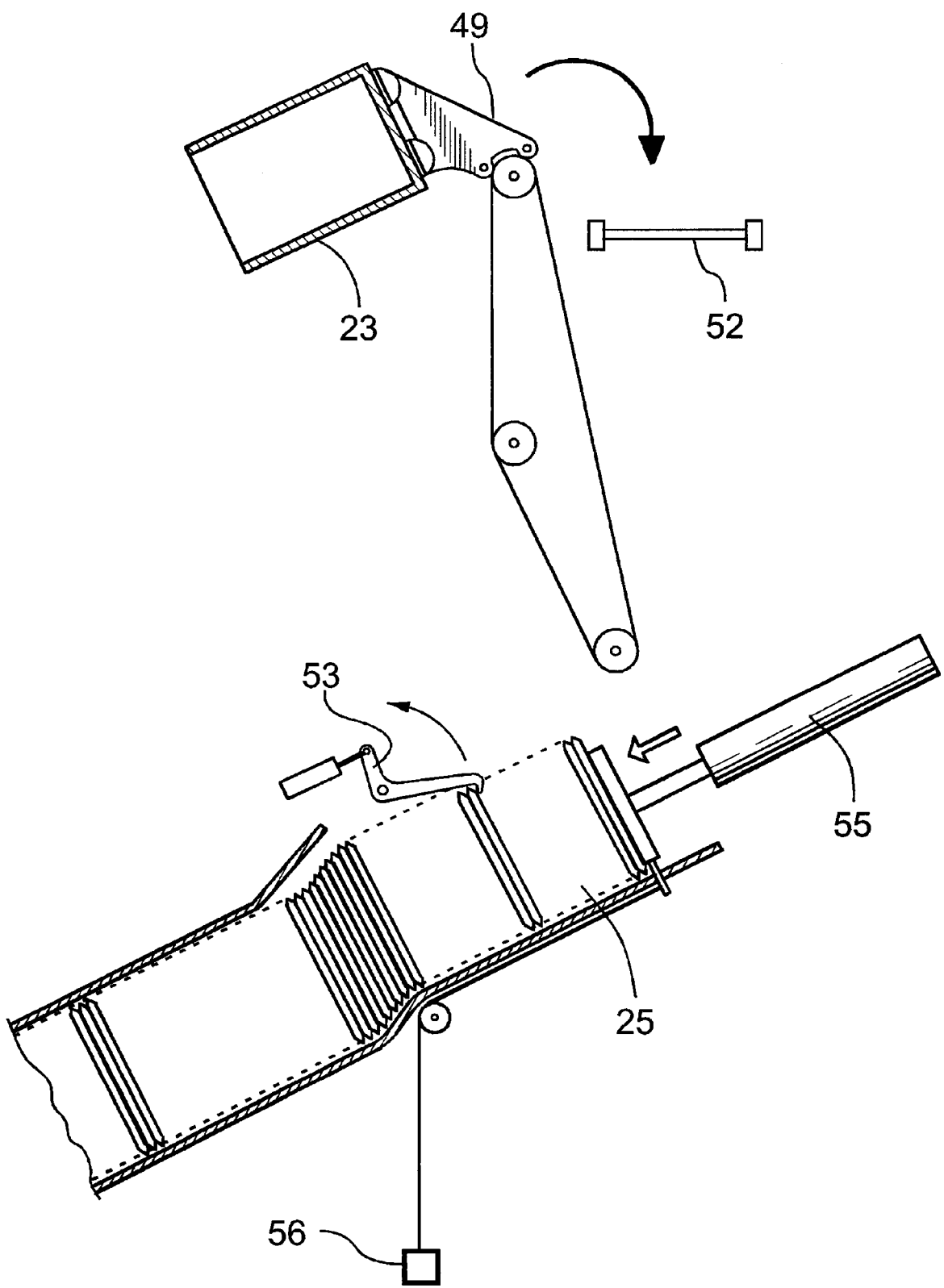
FIG. 4a is the same view of the apparatus as FIG. 4, shown in a different stage of operation.

In the interests of keeping the friction on the box 23 at a minimum, the box also should not be subjected to any side pressures from outside the box. Thus, the cartons already on the tray should be kept clear of the box 23 and cartons that have just been placed on the tray, as the box 23 is withdrawn. FIG. 4 shows a hook 53 which is activated to hold the last carton on the tray clear of the just-placed box 23, whereby the box 23 can be withdrawn upwards without the cartons 54 already on the tray 46 touching the box at all.

During normal operation of the magazine 28, the cartons are drawn off the left end of the tray 46, one by one (at a rate typically of around one per second), by the carton-picker 30. A weight 56 serves to bias the cartons on the tray to the left, and into contact with the carton-picker. When the time comes to replenish the magazine (which is indicated by the stack of cartons no longer masking a photocell beam (not shown)); the weight 56 must be retracted, in order to provide a space on the tray into which the fresh batch of cartons can be inserted. The weight 56 is retracted, i.e raised, by operation of the ram 55. First, just before the weight is retracted, the hook 53 is activated, to engage the last of the present cartons and to hold same biassed against the carton-picker for the few seconds it will take to replenish the magazine. Given that the cartons are being picked at a rate of one per second, the contact force between the cartons and the carton-picker will start to decrease as each carton is picked, and the resilience of the stack of cartons should be such that the cartons are still being pressed with a reasonable force even after several cartons have been picked. A stack of several hundred cartons in the magazine has enough resilience, however, to maintain force on the carton-picker for a few seconds, even though the cartons are being picked at the one-per-second rate.

Thus, at the moment when the box of cartons is deposited on the tray, the material of the box is not subject to being touched or pressed, nor to being contacted at all, by the cartons 54 already present on the tray. The biassing weight 56 is withdrawn also, whereby the box resides on the tray, without anything touching it. This condition can be allowed to continue for the two or three seconds needed for the suction cups 48 to adhere to the upturned bottom 36 of the box 23, and to pull the box upwards and clear. Once the box 23 is clear, and the fresh cartons have been left behind, residing on the tray, the biassing-weight 56 can be re-applied, whereupon the fresh cartons are combined with the cartons already present on the tray of the magazine.

The tray is provided with a kink 57 in the surface of the tray. This kink is located below the hook 53. The hook prevents the tops of the cartons from backing up, and the kink prevents the bottoms of the cartons from backing up. Without the hook and kink, the stack of already-present cartons, now unbiased to the left when the weight 56 is withdrawn, might have enough resilience to swell to the right, and thus interfere with the placement and subsequent withdrawal of the box 23. The designer should see to it that the box 23 is not subjected to being touched by already-present cartons, nor by the biassing weight, nor by anything else, until the box has been lifted clear.

It has also been found beneficial to provide a ram 58 under the surface of the tray, which is arranged simply to keep up a constant drumming against the tray. The vibrations serve to make the box, and the cartons contained therein, move relative to each other as if the coefficient of friction of that movement were very small.

In the apparatus as shown in FIGS. 1–4, the cartons were fed into the carton-picker in a vertical orientation (or rather at a small angle to the vertical, as shown.) In FIGS. 5–9, the cartons in the magazine 59 lie in a vertical stack 60, i.e each carton in the stack 60 is horizontal. In this case, a bucket 62 is used to orientate the cartons to the horizontal, but, as explained above, the designer should not arrange for the box 23 to be pulled clear at a time when the box is laid on its side. That is to say, the box should be pulled upwards, and clear of the cartons, when the cartons are lying vertically, and when the bottom of the box is upturned and uppermost. A small angle to the vertical is acceptable, but the box lying horizontally on its side would not be acceptable.

Figure 5:
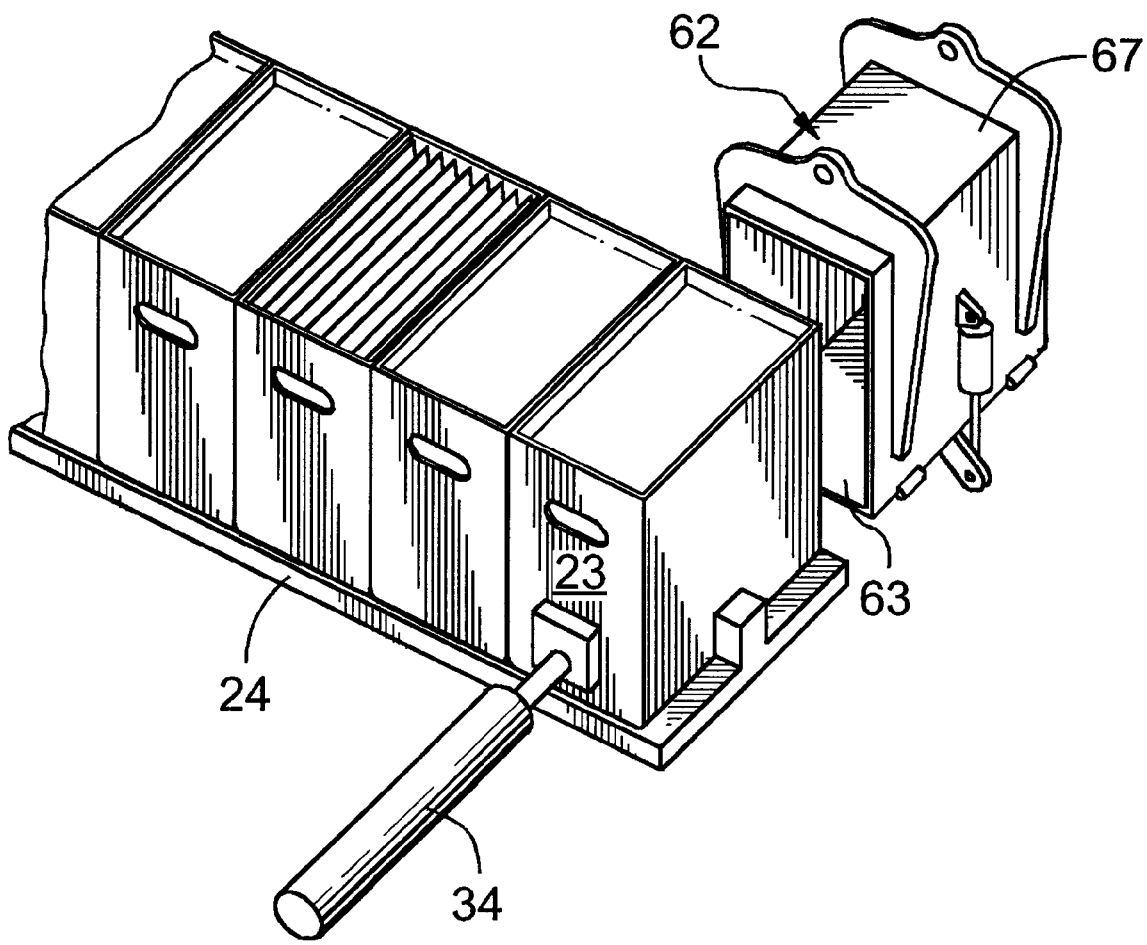
FIG. 5 is a diagrammatic representation of another apparatus that embodies the invention.

The bucket 62 is provided with an operable, i.e openable, floor panel 63. As shown in FIG. 5, the floor panel 63 is closed at the time when the senior box 23 is first transferred into the bucket 62 from the box-conveyor 24. Then, the box is inverted, i.e turned upside down, through 180 degrees, so that the bottom 36 of the box 23 is uppermost. Next, the floor panel 63 the bucket 62 is opened. Next, a trolley 64 with a suction head is then brought down, picks up the box 23, and withdraws the box upwards. This trolley may be constructed and operated as described in relation to the trolley 49 in FIG. 3.

With the box 23 withdrawn, the bucket 62 now contains the bundle 25 of loose cartons 26, which lie resting on the roof panel 67 of the bucket (FIG. 7). The cartons are to be stacked with each carton horizontal in the magazine 59. So, the floor panel 63 is closed, and the bucket 62 is rotated through ninety degrees, whereby the cartons 26 now lie each one horizontally (FIG. 8). In fact, it might be acceptable for the floor panel 63 to remain open during this last rotation of the bucket, but it would be more prudent to close the floor-panel. Of course, both ends of the bucket 62 are open, (as were both ends of the bucket 32) and the designer should see to it that the movements of the bucket 62 are not so violent that the loose cartons 26 therein might be shaken out of the open ends—nor indeed out of the open floor-panel 63, if such were left open.

Once the bucket 62 has been orientated to the position where the cartons 26 are horizontal, the cartons in the bucket can now be transferred from the bucket as a bundle 25 into the magazine 59. This is done by a ram 68 (FIG. 9). As shown in FIG. 8, a pusher 69 on the end of the ram 68 has fingers 70, which make sure the lowermost carton is transferred with the others. During the pushing-out of the cartons into the magazine, the cartons are received on a temporary ledge 72, which is moved into place by a ram 73. When the bundle 26 of cartons is fully in place on the ledge 72, the ledge is withdrawn, and the bundle is dropped down onto the cartons below.

In FIG. 9, the carton-picker 74 is of the type that requires the cartons to be fed to it each one orientated horizontally, but again the force between the cartons in the magazine and the carton-picker should remain reasonably constant for good reliability and accuracy of picking. Depositing the cartons one bundle at a time, as needed, into the magazine ensures this required minimum variation in the pressure acting on the carton-picker 74.

In order to signal the need for the stack 60 of cartons to be replenished, a photocell 75 detects when the stack drops below a predetermined level. This triggers the cycle that results as described in a fresh bundle of cartons being deposited on the stack.

The rams 34,46,68 that are used for pushing the boxes and cartons into and out of the bucket need not operate on a straight-line push basis, as shown in FIGS. 1–9, but rather the rams may operate pivot arms on a swing-through-an-arc basis. The designer of course must see to it that the arcs of movement of such arms are adequate to provide the necessary range of motions. On the other hand, the withdrawal of the box upwards should be in a straight line upwards. The designer should not provide the upwards movement of the box, using the suction cups, on a swing-through-an-arc basis. In that case, the box would be bound to brush against either the cartons or against some part of the apparatus, and thereby incur friction. The straight pull, directed upwards, as provided by the trolley 49,64 on its tracks 50 is important from the standpoint of ensuring freedom from friction when pulling the box clear.

Figure 10:
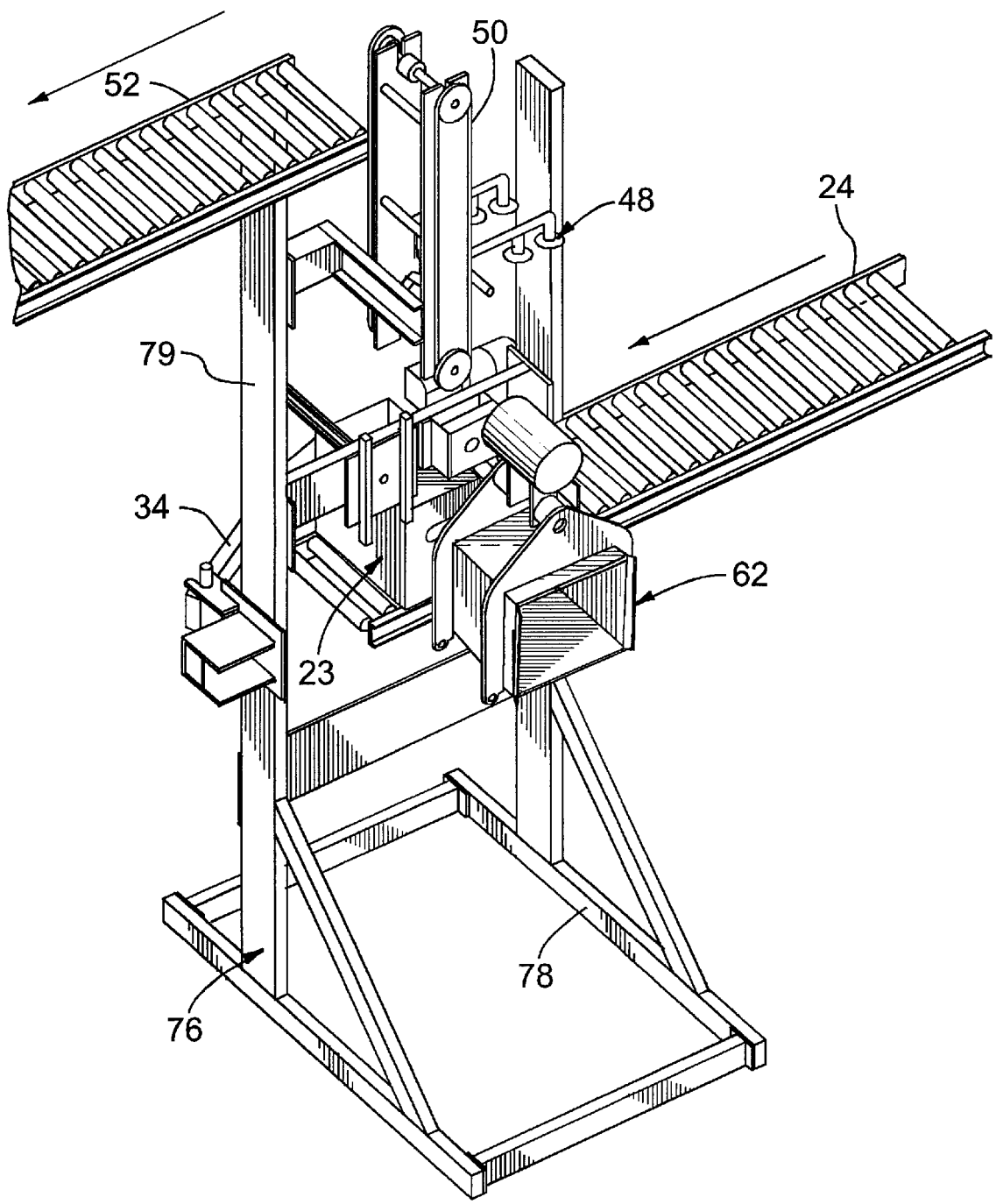
FIG. 10 is a pictorial view of the apparatus similar to that shown in FIG. 5.
Figure 11:
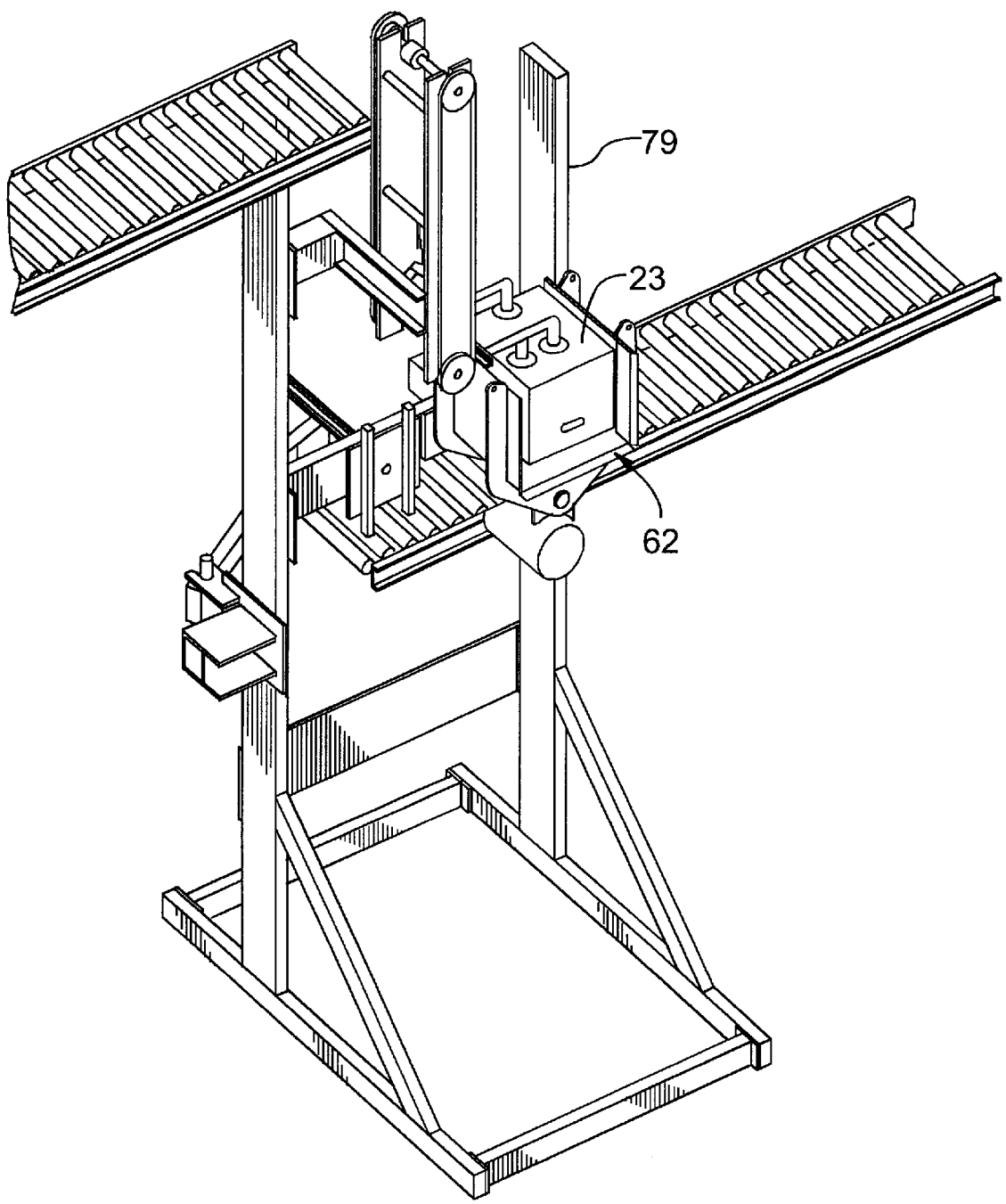
FIG. 11 is the same view as FIG. 10, but shows the apparatus at a different stage of operation.
Figure 12:
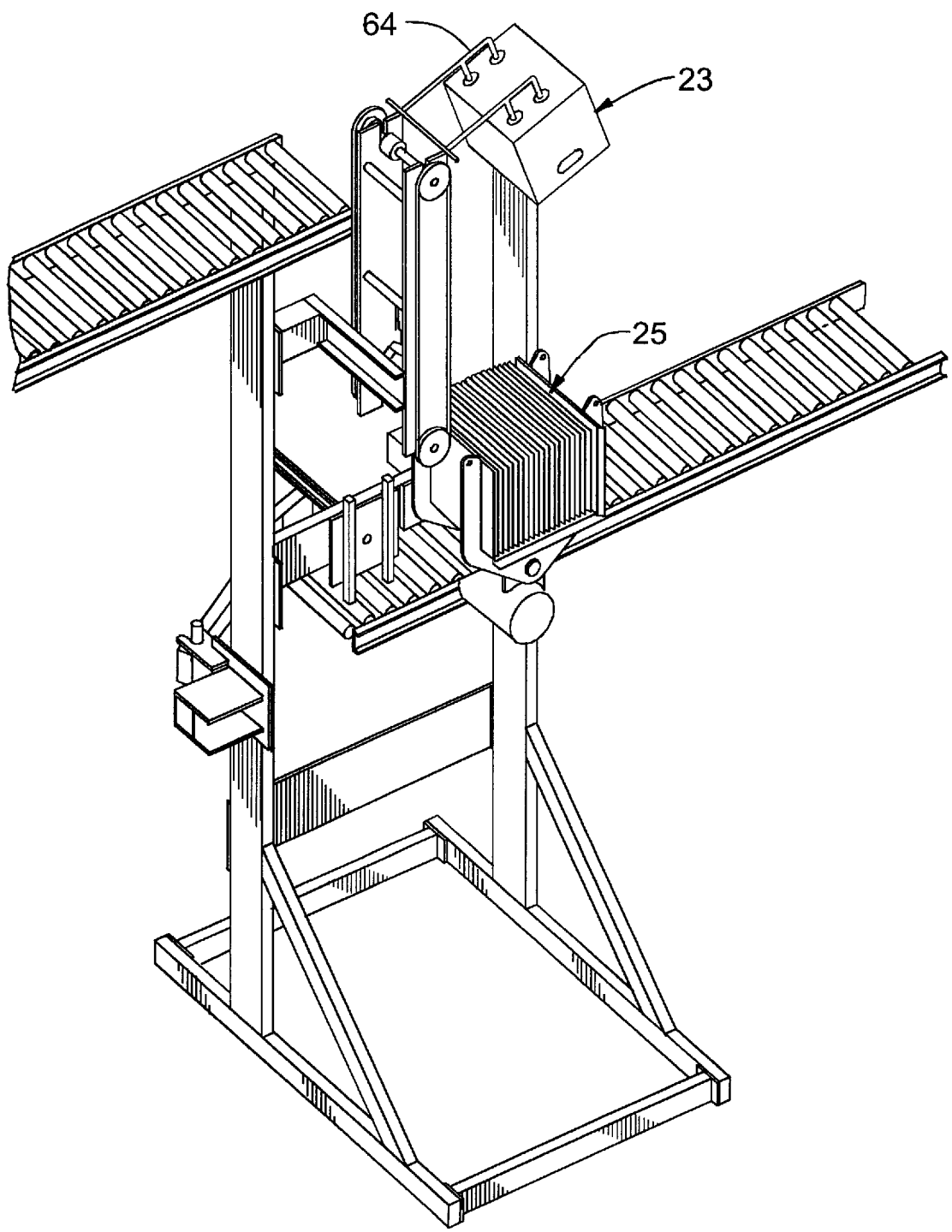
FIG. 12 is the same view as FIG. 10, but shows the apparatus at a different stage of operation.

FIG. 10 is a more representative view of the physical form of the apparatus of FIGS. 5–9. FIGS. 11 and 12 show the apparatus in the different stages of operation. In FIG. 10, the bucket 62 is in the box-receiving position, and the apparatus is set for the box 23 to be transferred into the bucket 62. In FIG. 11, the bucket has been inverted, the floor-panel 63 has been opened, and the box is being drawn upwards by the suction head 65 on its trolley 64. In FIG. 12, the box is being transferred to the box disposal conveyor 52. The next operations are that the bucket is orientated through 90 degrees to bring the cartons left in the bucket to the horizontal position, and then the cartons are transferred out of the bucket, onto the magazine. The magazine is not shown in FIGS. 10–12.

The operational components are mounted on a frame 76, which includes base rails 78, and uprights 79. The main components are clamped directly to the uprights 79. Generally, the apparatus as described is being fitted as an add-on to an already-existing line in a packaging plant, in which the magazine has hitherto been replenished manually, or more or less manually. Usually, the carton-picker and magazine itself will not be replaced at the same time as the present apparatus is being fitted. For minimum disruption to the packaging process, the designer should make the apparatus as flexible (i.e versatile) as possible from the standpoint of accommodation to various sizes, configurations, heights, layouts, etc, of the existing box and carton handling machinery. The manner of construction of the apparatus shown in FIG. 10, i.e clamping the major components to the uprights, crossbars, etc, of the frame, allows the components to be adjusted for height and position. The fact that the uprights are mounted on the base rails to form a unitary frame means that the frame can be maneuvered into position as an integral whole, and the components built up therefrom. Of course, the designer must see to it that the apparatus will fit the particular installation, but with the manner of construction of the apparatus as shown, a good degree of universality of installation can be achieved. As mentioned, the box-conveyor and the box-disposal-conveyor that go with the present apparatus are positioned overhead, where, generally, there is space even for long conveyors to be accommodated, out of the way of the facilities used in the rest of the packaging operation.

What is claimed is:

1. Apparatus for unpacking boxes of items, wherein:
   the apparatus includes a box-conveyor for storing a quantity of tilled boxes, the boxes containing respective batches of items;
   the apparatus Includes an item-magazine, for storing a quantity of the items, when unpacked from the box, ready for further processing;
   the apparatus Includes a bucket, which Is orientatable relative to a frame of the apparatus, the bucket having an open-end, and an operable means for orientating the bucket;
   the bucket is orientatable In that the bucket is pivotable about a bucket-pivot, relative to the frame of the apparatus;
   the apparatus includes an operable means for transferring the first box from the box-conveyor, with its respective batch of items therein, into the bucket, via the open-end of the bucket, and the means for transferring the box is operable when the bucket is in the box-receiving-orientation;
   the means for orientating the bucket is effective, when operated, to orientate the bucket, together with the box and the batch of items therein, about the bucket-pivot, to a box-inverted orientation of the bucket;

the box has side-panels and a floor-panel, and the side-panels terminate in top edges which define an open top of the box;

the bucket includes a floor panel, a roof panel, and other panels, which together define a hollow tube, and the hollow tube extends across the bucket, from side to side of the bucket, and the hollow tube defines a tubular axis of the bucket;

the hollow tube of the bucket is substantially enclosed, to the extent that the bucket physically constrains the box therein against movement of the box, at least while the bucket is undergoing pivoting movement about the bucket-pivot, being movement of the box in all modes of movement relative to the bucket other than sliding of the box along the tubular axis of the bucket;

in the box-receiving orientation of the bucket, immediately upon insertion of the box into the bucket, the orientation of the box and the orientation of the bucket are such that the box rests under gravity against the floor-panel of the bucket, and the items in the box rest under gravity in contact with one of the panels of the box;

in the box-receiving orientation of the bucket, the open top of the box faces upwards, to the extent that the Items do not fall out of the box:

the floor panel of the bucket is planar, and the arrangement of the apparatus is such that the plane of the floor panel lies parallel to the axis of the bucket-pivot, and remains so during pivoting movement of the bucket;

the axis of the bucket pivot lies substantially parallel to the tubular axis of the bucket; the arrangement of the apparatus is such that, When the bucket is orientated to the box-inverted orientation of the bucket:

(a) the box is inverted, whereby the floor-panel of the box faces upwards;

(b) the box falls under gravity within the bucket to a orientation in which the top-edges of the side-panels of the box come to rest on the said other panel of the bucket; and (c) the items fall under gravity out through the open top of the box and come to rest on the said other panel of the bucket;

the apparatus includes an operable gripping-means, which is effective, when operated, to grip the upturned box, and an operable box-lifting-means for raising the gripped upturned box upwards, clear of, and away from, the batch of items;

and the apparatus includes an operable means for transferring the batch of items to the item-magazine.

2. Apparatus of claim 1, wherein the apparatus includes:

an operable upturned-box-relieving-means, for relieving the sides of the box of lateral pressure tending to urge the sides of the box into contact with items inside the box, whereby the friction of said contact would tend to resist upwards motion of the box relative to the items;

and a means for operating the box-lifting-means simultaneously with the upturned-box-relieving-means.

3. Apparatus of claim 2, wherein the upturned-box-relieving-means comprises a means for transferring the upturned box, the bottom of the box being uppermost, the items being still inside the box, out of the box and onto a tray of the magazine, and comprises an operable means for holding items already on the tray away from the panels of the upturned box.

4. Apparatus of claim 3, wherein the means for transferring the upturned box to the tray comprises an operable tray-ram.

5. Apparatus of claim 4, wherein the tray-ram is arranged to push the box, and is mounted on the frame of the apparatus.

6. Apparatus of claim 3, wherein:

the apparatus includes means for operating the apparatus in the following sequence:

(a) first operating the means for orientating the bucket to turn the bucket with the box inside until the bottom of the box is uppermost, and the items fall through the open top of the box, and rest on the said other panel of the bucket;

(b) then operating the means for transferring the batch of items to the item-magazine to push the box together with the items therein out of the bucket and onto the tray of the magazine;

(c) then operating the box-lifting means to lift the box upwards, and clear of the items.

7. Apparatus of claim 3, wherein the magazine is so arranged that the unpacked items in the magazine are in a mainly-horizontal configuration, resting mainly on their edges on the tray of the magazine.

8. Apparatus of claim 2, wherein the upturned-box-relieving-means comprises a bucket that is wider than the width of the box, whereby the box fits loosely in the bucket, the box-lifting means being operable while the box is in the bucket.

9. Apparatus of claim 8, wherein the means for transferring the batch of items to the item-magazine comprises an operable magazine-ram.

10. Apparatus of claim 9, wherein the magazine-ram is arranged to push the batch of items as a whole unit, and is mounted on the frame of the apparatus.

11. Apparatus of claim 9, wherein one of the panels of the bucket is openable when the bucket is in the box-inverted orientation, to enable the box to be lifted upwards and out of the bucket, and the apparatus includes an operable means for opening the said panel of the bucket.

12. Apparatus of claim 11, wherein the apparatus includes means for operating the apparatus in the following sequence:

(a) first operating the means for orientating the bucket to turn the bucket with the box inside until the bottom of the box is uppermost, and the items fall through the open top of the box, and rest on the said other panel of the bucket;

(b) then operating the means for opening the panel of the bucket;

(c) then operating the box-lifting means to lift the box upwards, and clear of the items;

(d) then operating the means for orientating the bucket to turn the box through a substantial angle;

(e) then operating the means for transferring the batch of items to the item-magazine to transfer the batch of items out of the bucket onto the magazine.

13. Apparatus of claim 8, wherein the magazine is so arranged that the unpacked items in the magazine are in a vertical stack, the items being substantially horizontal, and resting one on top of another.

14. Apparatus of claim 1, wherein the axis of the bucket-pivot is horizontal.

15. Apparatus of claim 1, wherein the means for orientating the bucket, with the box and the items inside, is effective to invert the bucket through such an angle that the bottom of the box becomes uppermost.

16. Apparatus of claim 1, wherein the operable box-lifting means comprises a means for pulling the box upwards in a substantially straight line, and substantially not through an arc.

17. Apparatus of claim 1, wherein the means for gripping the bottom of the upturned box comprises a suction cup;

the suction cup is mounted on a trolley;

and the trolley is mounted on a track that is mounted on the frame of the apparatus, for tracked and guided movement of the trolley.

18. Apparatus of claim 17, wherein:

the track is so structured that the track is effective to guide the trolley for movement of the box upwards in a substantially straight line, and substantially not through an arc;

and the track is so structured that, once the box is clear of the items, the track is effective to turn the trolley until the empty box is right way up;

and the apparatus includes a means to then deposit the box on a box-disposal conveyor by releasing the suction cup.

19. Apparatus of claim 1, wherein the apparatus is so arranged that the bucket lies directly alongside a first one of the boxes on the box-conveyor, and the open-end of the bucket faces the first box, whereby the box can be pushed directly off the box-conveyor and directly into the open end of the bucket, in a single linear motion.

20. Apparatus of claim 19, wherein the means for transferring the box from the box-conveyor into the bucket is an operable box-to-bucket ram.

21. Apparatus of claim 19, wherein the means for transferring the box from the box-conveyor into the bucket is located adjacent the opposite side of the box from the side facing the open end of the bucket, whereby the said means, when operated, pushes the box into the bucket.

22. Apparatus of claim 21, wherein the means for transferring the box from the box-conveyor into the bucket is mounted on the frame of the apparatus, and the apparatus is so arranged that, in the box-receiving orientation of the bucket, the bucket and the box-conveyor are both stationary relative to the frame, and the said means pushes the box bodily relative thereto.

23. Apparatus of claim 19, wherein the arrangement of the box-conveyor is such that the boxes are stored thereon all in a line, and is such that when the first box is transferred off the box-conveyor, the other boxes thereon automatically advance forwards in the line.

24. Apparatus of claim 1, wherein the bucket is open at both ends, to the extent that the box can be pushed into the hollow tube of the bucket through one open end, and pushed out through the other open end.

* * * * *